United States Patent
Nemedi

(10) Patent No.: US 7,467,755 B2
(45) Date of Patent: *Dec. 23, 2008

(54) PARTS SEPARATOR APPARATUS AND METHOD OF SHREDDING

(75) Inventor: William D. Nemedi, Paw Paw, MI (US)

(73) Assignee: Inter-Source Recovery Systems, Inc., Kalamazoo, MI (US)

( * ) Notice: Subject to any disclaimer, the term of this patent is extended or adjusted under 35 U.S.C. 154(b) by 550 days.

This patent is subject to a terminal disclaimer.

(21) Appl. No.: 11/160,891

(22) Filed: Jul. 14, 2005

(65) Prior Publication Data

US 2005/0241998 A1    Nov. 3, 2005

(51) Int. Cl.
B02C 4/32 (2006.01)
B02C 7/14 (2006.01)
B02C 9/04 (2006.01)
B02C 11/08 (2006.01)
B02C 23/00 (2006.01)

(52) U.S. Cl. .................. 241/36; 241/79.1; 241/241

(58) Field of Classification Search .............. 241/243, 241/36, 21, 24.2, 24.29, 79.1, 79.3
See application file for complete search history.

(56) References Cited

U.S. PATENT DOCUMENTS

| | | | |
|---|---|---|---|
| 3,690,335 A | 9/1972 | Hirohisa et al. | |
| 3,929,293 A * | 12/1975 | Hahn et al. | 241/42 |
| 3,960,335 A | 6/1976 | Häberle | |
| 4,000,858 A | 1/1977 | Rudzinski | |
| 4,186,888 A | 2/1980 | Galanty | |
| 4,205,799 A | 6/1980 | Brewer | |
| 4,377,259 A | 3/1983 | Areaux et al. | |
| 4,424,891 A | 1/1984 | Dudley et al. | |
| 4,629,134 A | 12/1986 | Pennekamp | |
| 4,691,871 A | 9/1987 | Mochizuki | |
| 4,720,050 A * | 1/1988 | Eberhardt | 241/46.06 |
| 4,936,822 A | 6/1990 | Nemedi | |
| 5,035,367 A * | 7/1991 | Nojima | 241/37.5 |
| 5,106,487 A | 4/1992 | Nemedi | |
| 5,110,060 A | 5/1992 | Lundquist | |
| 5,135,178 A | 8/1992 | Strohmeyer | |
| 5,236,139 A | 8/1993 | Radtke | |
| 5,252,208 A | 10/1993 | Nemedi | |
| 5,264,124 A | 11/1993 | Nemedi | |
| 5,275,727 A | 1/1994 | Nemedi | |
| 5,285,973 A * | 2/1994 | Goforth et al. | 241/36 |
| 5,330,637 A | 7/1994 | Nemedi | |
| 5,345,665 A | 9/1994 | Nemedi | |
| 5,383,941 A | 1/1995 | Nemedi | |
| RE35,307 E | 7/1996 | Nemedi | |

(Continued)

OTHER PUBLICATIONS

Chip Processing (Brochure), Inter-Source Recovery Systems, Inc. (circa 1999).

(Continued)

*Primary Examiner*—Bena Miller
(74) *Attorney, Agent, or Firm*—Marshall, Gerstein & Borun LLP

(57) ABSTRACT

A parts separator apparatus for use with a centrifugal separator includes a shredder apparatus located within an inlet section of the parts separator. The shredder apparatus shreds wet chip material prior to the wet chip material passing over a drop-out opening in the parts separator.

13 Claims, 5 Drawing Sheets

U.S. PATENT DOCUMENTS

| | | |
|---|---|---|
| 5,680,999 A | 10/1997 | Wada |
| 5,803,143 A | 9/1998 | Willis |
| 5,944,992 A | 8/1999 | Nemedi et al. |
| 6,079,645 A | 6/2000 | Henreckson et al. |
| 6,094,795 A | 8/2000 | Davenport |
| 6,125,992 A | 10/2000 | Dudley |
| 6,126,099 A | 10/2000 | Fachinger et al. |
| 6,129,851 A | 10/2000 | Nemedi et al. |
| 6,253,929 B1 | 7/2001 | Nemedi et al. |
| 6,375,841 B1 | 4/2002 | Nemedi et al. |
| 6,405,877 B1 | 6/2002 | Nemedi et al. |
| 6,540,087 B2 | 4/2003 | Nemedi et al. |
| 6,572,779 B2 | 6/2003 | Nemedi et al. |
| 7,028,935 B2 | 4/2006 | Nemedi |
| 7,175,119 B2 | 2/2007 | Nemedi |
| 2003/0178518 A1 | 9/2003 | Nemedi |

OTHER PUBLICATIONS

"Two-Stage Scrap Metal Shredder," U.S. Appl. No. 08/785,645 (filed 1997—abandoned).

\* cited by examiner

PARTS SEPARATOR APPARATUS AND METHOD OF SHREDDING

FIELD

The present invention is directed generally to a parts separator apparatus for use with a centrifugal separator and in a method of shredding, and, more particularly, to a parts separator apparatus having a shredder apparatus disposed within the parts separator.

BACKGROUND

In the course of machining operations, scrap materials, known as wet chips, are generated. The wet chips usually include relatively small wet chips, referred to as granular wet chips, stringy pieces of wet chips as well as bales of wet chip material. Additionally, undesired solids such as bolts, nuts, etc. sometimes are found in the bales or batches of wet chip material. Wet chip materials are conveyed from one or more machine stations to a centrifugal separator station where the wet chip material is centrifugally separated into dry chips and fluid.

Prior to entering a centrifugal separator apparatus, wet chips pass through a parts separator apparatus generally having an air lock assembly as well a material drop-out opening. The wet chip material enters the parts separator, travels past the air lock assembly located in an inlet chute or section, flows over the drop-out opening, and then, after passing through an outlet chute or section, enters into the centrifugal separator. Heavy unwanted solid objects, such as bolts and nuts, drop out of the system at the location of the parts separator drop-out opening. The air lock apparatus, which is generally a paddle wheel assembly, comprises a plurality of rotatable paddles, such as illustrated in Nemedi U.S. Pat. No. 5,106,487. The air lock assembly serves to assist in maintaining a desired negative air pressure within the parts separator during the operation of the centrifugal separator. The negative air pressure is generated upon actuation of the centrifugal separator to which the parts separator normally is connected. The negative air pressure in the parts separator normally allows for wet chip material to be pulled from the air lock assembly and across the parts separator drop-out opening following which the wet chip material enters the centrifugal separator apparatus.

In some instances, wet chip material entering a parts separator originates from a plurality of machine stations. In this situation, the size of the wet chips generated at one station sometimes varies substantially from wet chips generated at another work station. As a result, wet chip material of different sizes enters the parts separator. Unfortunately, it has been found that, in some instances, larger size wet chips from one machine station fail to pass over the parts separator drop-out opening. Instead, some larger size wet chips drop out of the parts separator drop-out opening, where they have to be collected and reintroduced into the wet chip separation system. It is thus desired to limit this problem.

Further, it has been found that, on occasion, some larger undesired solids, e.g., bolts or nuts travel at such a relatively high velocity within the parts separator apparatus that they cause damage to the air lock assembly or the parts separator frame. It is also desired to limit this problem.

Further, it is desired to limit the need for a conventional paddle-wheel-type air lock assembly that often is disposed within a parts separator apparatus.

SUMMARY

Briefly, a shredder apparatus having a shredder wheel assembly attached to a reversible motor, such as shown and disclosed in my pending patent application, Ser. No. 10/611,526, which is hereby incorporated by reference in its entirety in the present application, is disposed within the inlet section of a parts separator apparatus. The shredder apparatus is located within the inlet chute of the apparatus preferably contiguous to the parts separator drop-out opening. Wet chip material of varying sizes and/or bales enter the inlet chute of the parts separator apparatus where the wet chip material is shredded into wet chip material having a relatively uniform size. The shredded wet chip material then passes over the parts separator drop-out opening into the parts separator outlet chute from where it enters a centrifugal separator apparatus where the wet chips are centrifugally separated into dry chips and fluids.

In some instances, where relatively large undesired solid objects, e.g. bolts, nuts, etc., are found in the wet chip material entering the parts separator, the shredder apparatus is unable to shred these objects. The shredder apparatus will sense these undesired objects and stop. The shredder apparatus motor then will change direction whereupon shredder wheels will reverse direction and pick up the undesired object(s) and transport the object(s) within the system whereby the undesired object(s) can relatively easily exit the parts separator through the drop-out opening. Accordingly, the velocity of an undesired object within the parts separator can be reduced and the direction of the undesired object within the parts separator apparatus can advantageously changed.

Finally, in some instances, utilizing the above-referred shredder apparatus within the parts separator obviates the need for an air lock assembly in an inlet chute of the parts separator apparatus.

DETAILED DESCRIPTION

Figure 1:
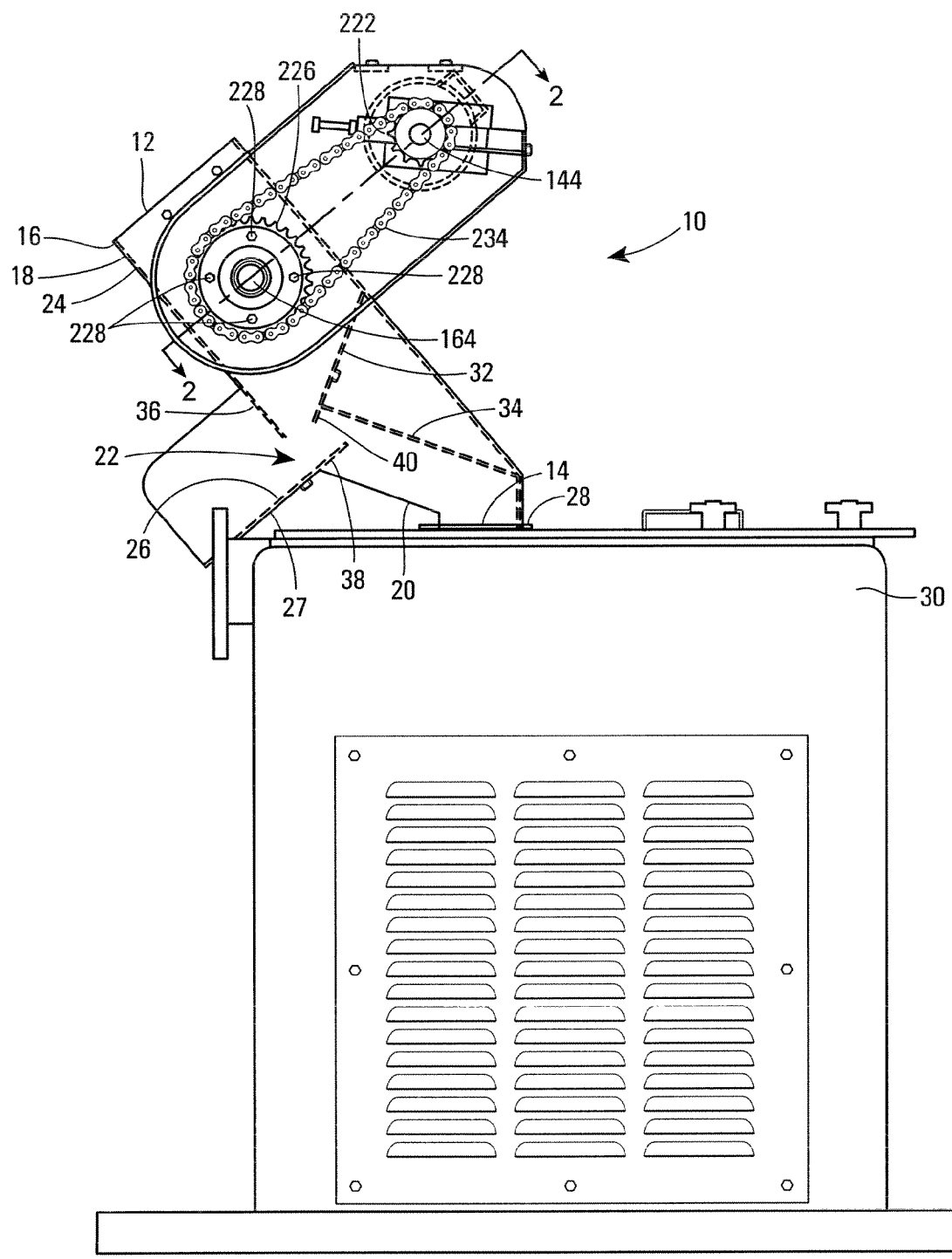
FIG. 1 is a right side view of a parts separator apparatus containing a shredder apparatus, with one wall of the shredder apparatus housing removed to expose the drive assembly and with the parts separator apparatus connected to a conventional centrifugal separator apparatus.

Referring to the drawings, FIG. 1 illustrates a parts separator apparatus 10 having an outboard end 12 and an inboard end 14 located downstream from end 12. End 12 often is flanged (not shown) and is adapted to be connected to a flange of a conventional mechanical conveyor as, for example, an auger type conveyor. The mechanical conveyor conveys both wet chips to be separated as well as heavy undesired heavy pieces, e.g., bolts, nuts, tools, to parts separator 10.

Parts separator 10 includes a frame assembly comprising a chute member 16 comprising a first, inlet section 18 that extends in a first direction from outboard end 12 and has an inlet opening; a second, outlet section 20 that extends in the first direction and has an outlet opening; and, a heavy material drop-out opening 22 that is located in the bottom wall 24 at the exit end of first chute section 18 and is positioned contiguous to the first and second sections 18, 20. A drop-out chute 26 is positioned below heavy material drop-out opening 22.

End 14 of parts separator 10 includes flange 28, which is illustrated as being connected to the top of a centrifugal separator 30, such as is offered for sale by Intersource Recovery Systems, Inc., Kalamazoo, Mich. and is shown in Intersource's catalog entitled "Chip Processing," copyrighted in 1997 or such as is shown in any one of U.S. Pat. Nos. 4,936,822, 5,252,208, 5,264,124, 5,275,727, 5,944,992, and 6,129,851, all of which are hereby incorporated in their entirety herein. Typically, upon actuation of the centrifugal separator apparatus 30, a vacuum or negative air pressure is created within parts separator apparatus 10, such that wet chips and other materials entering parts separator 10 are pulled through the parts separator apparatus into centrifugal separator apparatus 30, where the wet chips are centrifugally separated into dry chips and fluid.

Baffle plates 32, 34 are disposed within parts separator apparatus 10 to assist in directing materials through parts separator apparatus 10. Baffle plate 36 can be mounted for adjustment on the bottom wall 24 of chute section 18. Similarly, baffle plate 38 can be mounted for adjustment on bottom wall 27 of drop-out chute 26, while baffle plate 40 can be mounted for adjustment on baffle plate 32. Baffle plates 36, 38, 40 can be adjustably positioned to either increase or decrease the open area surrounding material drop-out opening 22 at the exit end of first chute section 18, as well as the size of the entrance opening leading into second chute section 20.

Heretofore a rotary air seal assembly, such as illustrated in Nemedi U.S. Pat. No. 5,106,487, normally was disposed within the first chute section 18 of chute member 16. The rotary air seal, which comprises a plurality of rotatable paddles, served to act as a seal to some extent and, at the same time, to contact wet chip material to be separated in the first chute section 18 and to assist the material as it traveled along in the parts separator apparatus 10. In the particular embodiment shown herein, the rotary air seal assembly has been replaced by shredder apparatus 100 disposed within the first section 18 of chute member 16.

Figure 2:
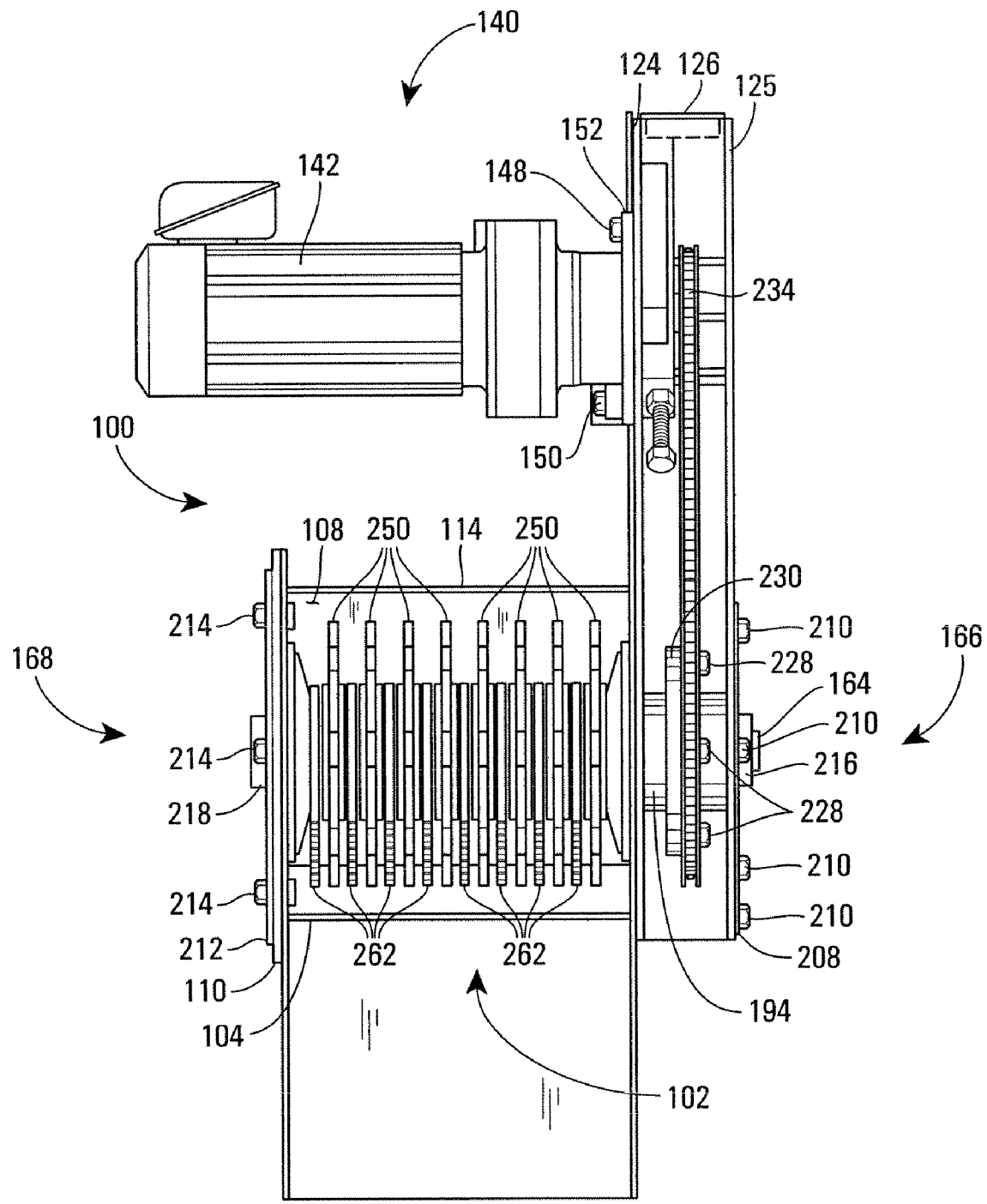
FIG. 2 is a cross-sectional view of the parts separator apparatus and shredder apparatus of FIG. 1 taken along line 2-2 in FIG. 1.

Turning to FIGS. 1 and 2, shredder apparatus 100 comprises housing assembly 102 that includes base or bottom wall 104, front wall 106 (see FIG. 4), back or rear wall 108 and side wall 110. Front wall 106 has a relatively large opening in it. Open top wall 114 is fixed at top wall ends and top wall sides to the appropriate housing front 106, back 108 and side wall 110.

Motor mount wall 124 extends outward from base wall 104. Wall 124 is substantially parallel to side wall 110. A second wall 125 is spaced from and substantially parallel to wall 124. Top wall 126, which can be made of either a rigid or flexible material, is removably attached to spaced side walls 124, 125.

A drive assembly 140 includes motor 142 having a shaft 144 (see FIG. 1) with a bushing keyed to the shaft 144. Screws 148, 150 extend through threaded openings both in motor flange 152 and wall 124. Screws 148, 150 thread into tapped holes in a motor mounting plate which abuts wall 124. It has been found that a 460 Volt, three phase, 60 Hz electric motor may be employed. It is appreciated that other size motors could be utilized by one of ordinary skill in the art.

Positioned below motor 142 is fixed shaft 164 (see also FIG. 1) which is greater in length than the distance between outer sidewall 110 and side wall 125. Elongated shaft 164 is tapered for a portion at each shaft end 166, 168. The taper extends inwardly for a discrete distance from each shaft end, and includes a first, outer tier of smaller diameter and a second, inner tier of larger diameter.

Figure 3:
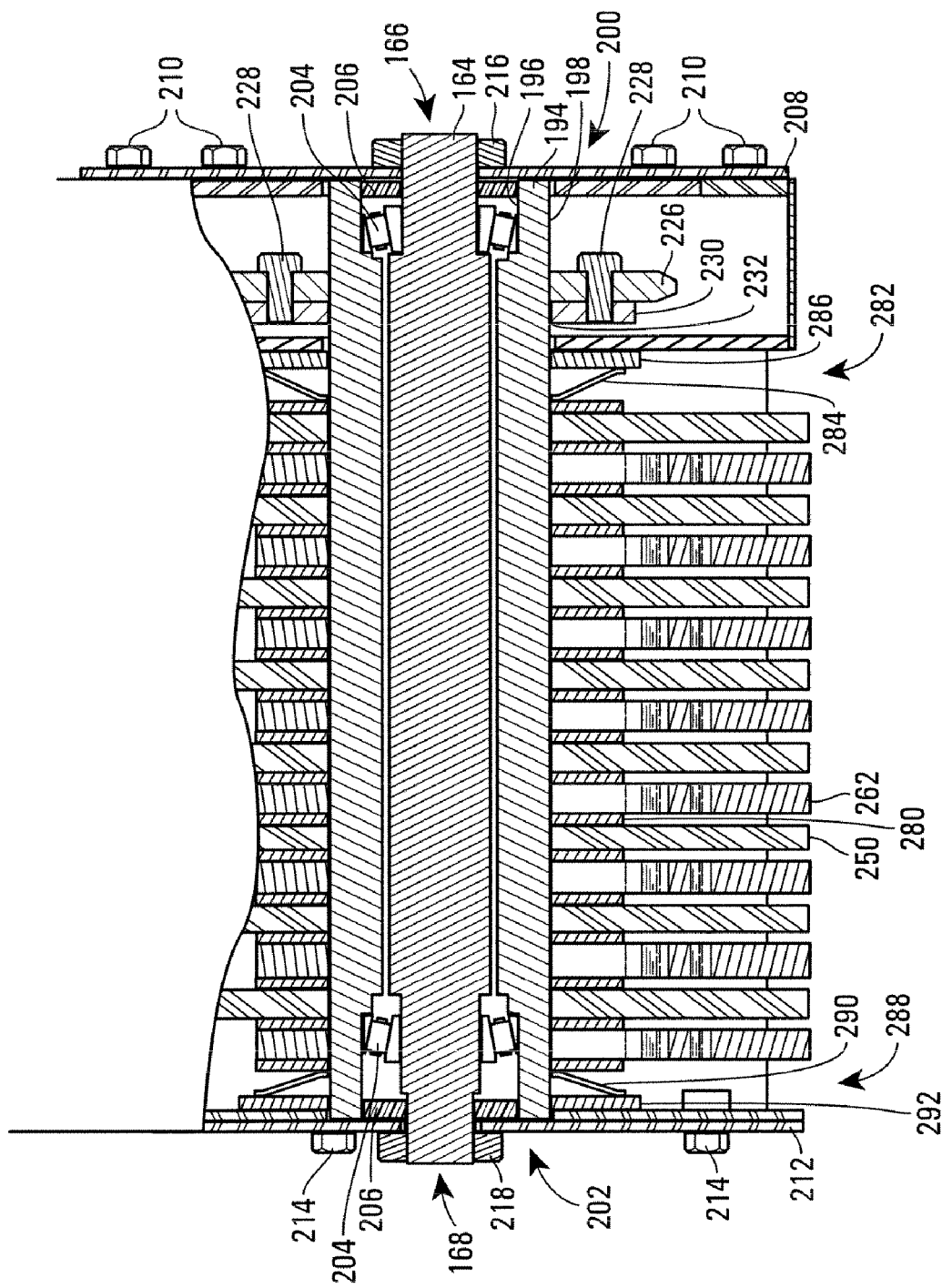
FIG. 3 is a further, partial cross-sectional view of the parts separator apparatus and shredder apparatus of FIG. 1 taken along line 2-2 in FIG. 1.

As shown in FIG. 3, cylindrical rotor 194 having an outer surface 196 and inner surface 198 is positioned over fixed shaft 164. Rotor 194 is recessed at each rotor end 200, 202. Two bearings 204 (which may define a bearing assembly) are sandwiched between shaft 164 and rotor 194, with one bearing disposed on the second tier of shaft 164 contiguous to shaft end 166 and one bearing disposed on the second tier of shaft 164 contiguous to shaft end 168. Moreover, first and second seal members 206 (which may define a seal assembly) are also disposed between shaft 164 and rotor 194, with one seal member being disposed on the first tier of the shaft 164 at shaft end 166 and a second seal member being disposed on the first tier of the shaft 164 at shaft end 168. The first and second seal members 206 may be made of any conventional sealing material such as polyvinyl chloride (PVC) or Buna N, so long as the material aids in providing a seal at the location of the rotor ends.

Faceplate 208 is bolted at 210 to sidewall 125, while faceplate 212 is bolted at 214 to a sidewall 110. Shaft end 166 extends through an opening in faceplate 208, and shaft end 168 extends through an opening in faceplate 212. Lock member 216 is disposed on shaft 164 at shaft end 166 and seats against faceplate 208. Lock member 218 is disposed on shaft 164 at shaft end 168 and seats against faceplate 212. Each lock member 216, 218 is illustrated as being welded to a respective faceplate 208, 212. If desired, other shaft locking arrangements, for example, a two piece clamp trough, could be employed. Similarly, the shaft ends could be threaded and lock nuts could be utilized in place of the locking arrangement shown in the drawings.

Returning to FIG. 1, a first sprocket 222 is keyed to motor shaft 144. A second sprocket 226 is bolted at 228 to sprocket mounting plate 230 (see FIG. 2), the latter being welded at 232 to rotor 194 at outer rotor surface 196. A drive chain 234 connects sprockets 222, 226 whereupon activation of motor 142 and the sprocket chain assembly, rotor 194 rotates on its bearings 204. Shaft 164 is fixed in place and does not rotate. Drive assembly 140 includes motor 142 and the sprocket chain assembly, the latter being enclosed by walls 124, 125, and 126.

Figure 4:
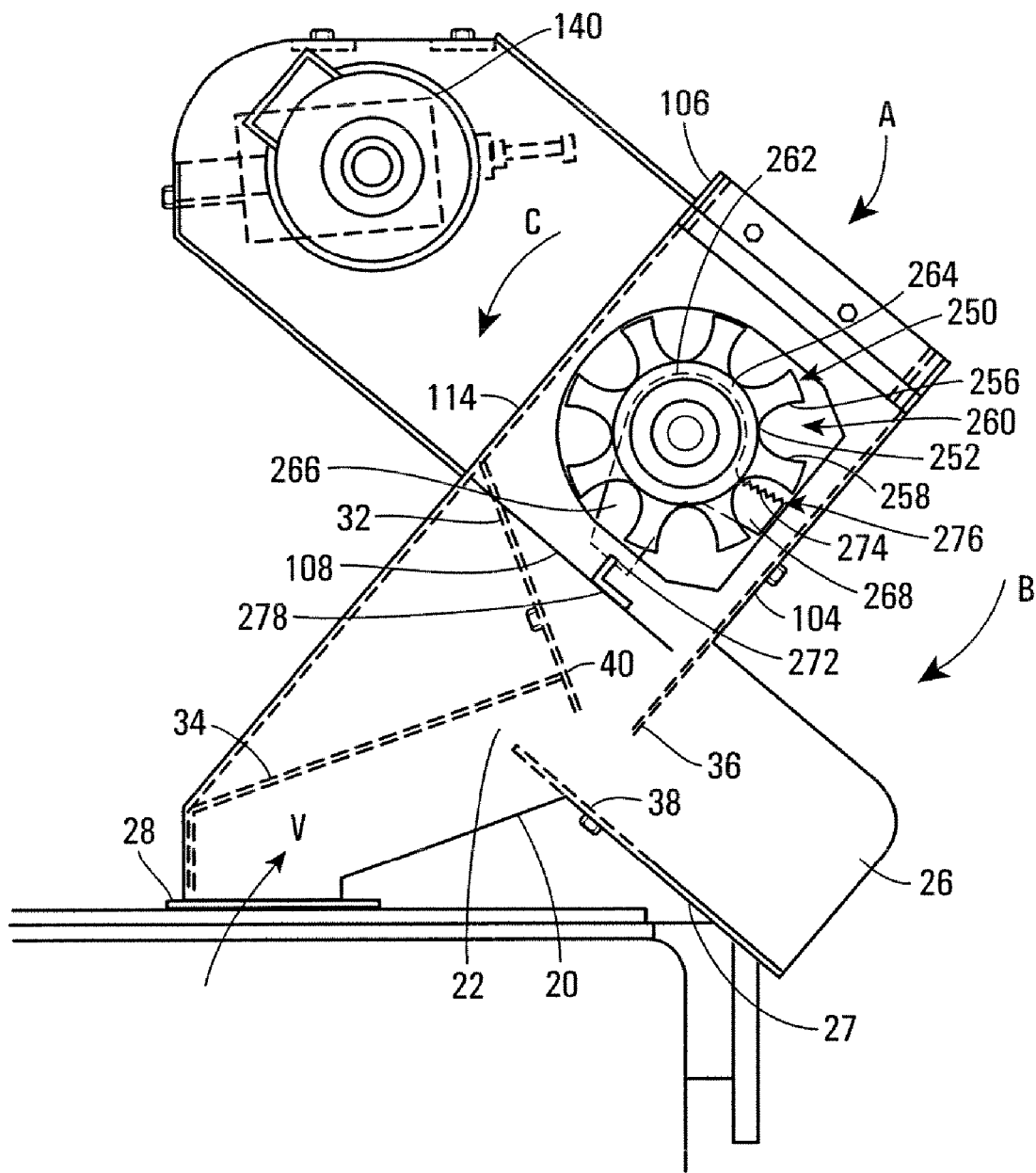
FIG. 4 is a left side view of the parts separator apparatus and shredder apparatus of FIG. 1, with a face plate removed to expose the shredder apparatus.

Referring next to FIGS. 3 and 4, a plurality of spaced shredder wheels 250, each wheel including spaced shredder arms 252 extending outwardly from the wheel (see FIG. 4), are keyed at different locations to rotor 194. As seen in FIG. 4, each shredder arm 252 has sides 256, 258 formed or grooved inwardly at 260 to define a concave surface. The shredder wheels 250 define a shredder assembly.

A plurality of spaced shredder comb members 262 is mounted or seated on rotor 194, and is positioned so that a comb member 262 is adjacent a shredder wheel 250. As seen in the embodiment of FIG. 4, each comb member 262 includes base portion 264, a first arm 266 and a second, spaced arm 268 extending outwardly from base portion 264. An opening is formed in base portion 264, while a key slot 272 is formed at the outboard end of comb arm 266. Comb arm 268 preferably is serrated at 274 along substantially the length of one side 276 of comb arm 268. The shredder comb members 262 also define a shredder assembly.

Each comb member 262 is adapted to be inserted on rotor 194, and seats on the rotor at the location of a comb member opening; however, the comb members 262 are free from rotation (i.e., do not rotate) with rotor 194. Each comb member 262 is keyed at the location of slot 272 to key bracket 278, the later being fixed to rear wall 108. Accordingly, shredder wheels 250 rotate relative to fixed adjacent comb members 262 and together, the shredder wheels 250 and comb members 262 cooperate to shred or otherwise cut wet chip material passing through shredder apparatus 100.

Spacers, in the form of washer-like members 280, are disposed on rotor 194 and positioned between adjacent shredder wheels 250 and comb members 262. The spacers 280 serve to space the shredder wheels 250 and comb members 262 apart so that, should any vertical misalignment of a shredder wheel 250 occur, the spacer 280 will preclude contact with another shredder wheel 250 or comb member 262.

Compression spring assembly 282 formed of compression spring 284 and spring plate 286 is positioned against the outboard surface of comb member 262 located near one end of rotor 194. Compression spring assembly 288 formed of compression spring 290 and spring plate 292 is positioned against the outboard surface of comb member 262 near the opposite rotor end.

As illustrated in FIG. 4, during the operation of the embodiment of shredder apparatus 100, wet chip materials to be shredded, comprising materials such as granular wet chips, stringy wet chips, unwanted solids (such as bolts, nuts, etc.), and lubricating, cooling, flume or other fluid, are delivered to an opening in the front wall 106 of shredder apparatus 100. The wet chip material moves into the shredder apparatus 100 traveling in the direction shown by the arrow "A".

Upon actuation of drive assembly 140, rotor 194 rotates and travels in a direction, represented by an arrow "B", that is the same direction as the direction of the wet chip material travel. As the wet chip material passes into shredder apparatus 100, shredder arms 252 engage the wet chip materials and direct at least the stringy wet chips toward a shredding station disposed at comb arm 268. Comb arms 268 and shredder arms 252 cooperate to shred the wet chips. As rotor 194 continues to rotate, shredded wet chips drop onto bottom wall 104 and pass toward and over drop-out opening 22. The shredded wet chips, now reduced to a desired size, then can be processed out of shredder apparatus 100.

In the event that a heavy, unwanted solid enters shredder apparatus 100, the solid travels in chute section 18 to the shredder station disposed at the comb arm 268. Inasmuch as shredder apparatus 100 cannot shred the unwanted solid, an increase in the motor amperage occurs, whereupon motor 142 stops and changes direction of rotation. With the change in the direction of rotation of the motor 142 (and in particular motor shaft 144), rotor 194 will change its direction of rotation, and shredder wheels 250, fixed to the rotor 194, will then rotate in the direction indicated by arrow "C". As the shredder wheels 250 rotate in the direction of arrow "C", the unwanted solid will be carried on one or more surfaces 260 on the shredder arm 252, and transported in the direction of arrow "C." The unwanted solid may be transported in somewhat of a circular direction until the unwanted solid, for example, drops onto the top of first comb arm 266 and passes therealong into the drop-out opening 22. After rotor 194 travels in the direction of arrow "C" for a period of time, for example, until at least the unwanted solid passes into the drop-out opening, motor 142 again changes direction and rotor 194 travels in the direction of arrow "B", whereupon shredding of the wet chip material resumes. As a result of this reversible motor operation, the speed of the undesired solid has been reduced and the direction of the solid has been changed, both of which serve to obviate parts separator damage which heretofore sometimes has occurred due to unwanted solids.

In normal operation, centrifugal separator 30 is first activated whereby the centrifugal separator will achieve its desired speed of operation, causing a negative pressure to be created in parts separator apparatus 10 during the start-up step. Then shredder apparatus 100 will be activated and shredding of wet chip material will commence. As the wet chip material is shredded, the negative air pressure will assist in pulling the shredded wet chip material over drop-out opening 22. Any unwanted solids that may have escaped the shredding operation will drop out of the system through opening 22. The unwanted solids can be collected in an unwanted solid bin or the like. The shredded wet chip material passes on to the centrifugal separator 30, where it is centrifugally separated into dry chips and fluid.

In addition to the shredder apparatus serving as a device to shred wet chip material within the parts separator, it has been found that shredder apparatus 100 may obviate the need for a conventional air seal assembly often utilized in the inlet chute of a parts separator. Further, the velocity of an unwanted solid is changed within the first chute section 18 as the unwanted solid changes direction as it is directed toward the parts separator drop-out opening when the rotor 194 reverses its direction upon sensing the unwanted solid.

Figure 5:
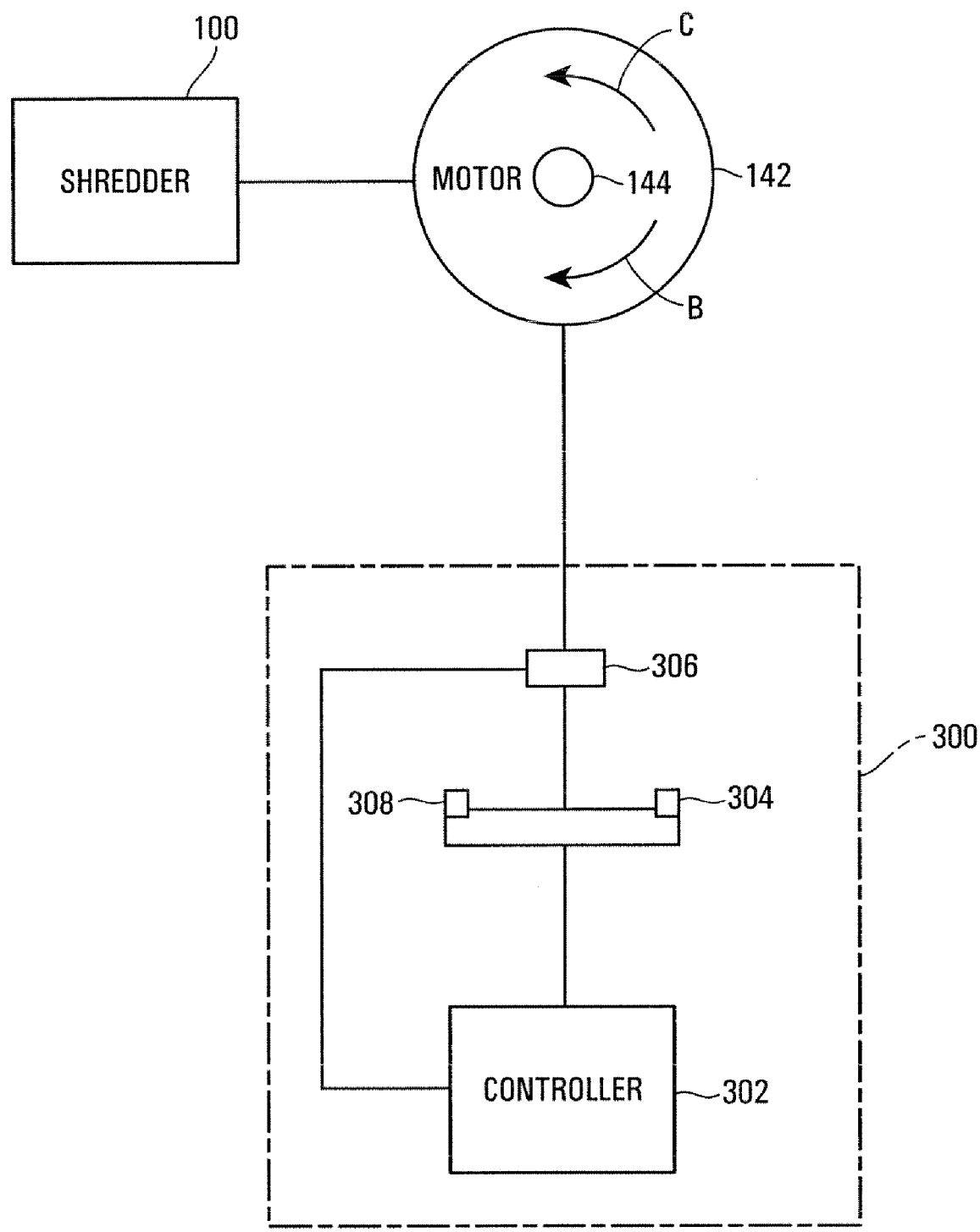
FIG. 5 shows a schematic block diagram of the drive assembly and controller assembly employed for activating the shredder apparatus.

FIG. 5 illustrates a controller system 300 associated with the embodiment of the shredder apparatus 100. The controller system 300 includes a controller 302. When controller 302 is turned to an "on" position, centrifugal separator apparatus 30 is actuated and achieves its normal speed of operation. Then the controller 302 closes forward switch 304 and actuates motor 142, which causes motor shaft 144 to rotate in the direction of arrow "B".

Upon contact of an unwanted solid with comb arm 268, increased amperage occurs in motor 142 and is sensed by sensor 306. The controller 302 receives signals from the sensor 306 representative of the increased amperage, and, in response, turns off motor 142 and opens forward switch 304 to a disconnect position. Following a dwell period of, for example, approximately one second, the controller 302 closes reverse switch 308 and actuates motor 142, causing motor shaft 144 to rotate in the direction of arrow "C".

Following a time period during which an unwanted solid is transported to the top of comb arm 266, the controller 302 turns off motor 142 and opens reverse switch 308. Following a dwell period of, for example, approximately one second, the controller closes forward switch 304 and actuates motor 142, whereupon motor shaft 144 again rotates in the direction of arrow "B" and shredding occurs at the location of shredder arm 268.

It is appreciated that while one system 300 for actuating motor 142 to permit shaft rotation in the direction of arrows "B" and "C" has been shown, other systems for rotating motor shaft 144 in the desired directions would be apparent to one of ordinary skill in the art. For example, rather than using the controller 302 to control the motor 142 to make motor shaft 144 rotate in a particular direction for a particular amount of time, the controller may control the motor 142 to make the motor shaft 144 rotate in a particular direction for a particular number of revolutions or over a particular angular distance.

Similarly, it is appreciated that a timing switch can be employed to initially actuate the centrifugal separator 30 and, after the desired time period during which separator 30 achieves its desired operational speed, shredder apparatus 100 then can be actuated.

While the bales of stringy wet chips are shredded principally at the shredder stations at the second comb arms 268 in the illustrated embodiment, shredding can also occur at the location of the first comb arms 266 during the course of the unwanted solid removal.

While comb arm 268 has been shown to have a serrated shredding or cutting surface 274 along side 276, it may be that, in some applications, serrations are not required. Accordingly, a person of ordinary skill in the art could select other shapes for the sides 276, for example, a smooth surface.

While one or more embodiments have been illustrated and described in detail herein, it will be understood that modifications and variations thereof may be effected without departing from the spirit of the invention and the appended claims.

What is claimed as new and desired to be protected by Letters Patent of the United States is:

1. A parts separator apparatus for shredding wet chip materials and separating out unwanted solids from the material, said parts separator apparatus comprising:
   a frame assembly comprising an inlet section having a wet chip inlet opening, an outlet section having a wet chip outlet opening and a drop-out opening disposed between said inlet and outlet sections;
   a shredder apparatus disposed within said inlet section;
   said shredder apparatus comprising a first shredder assembly having a plurality of first shredder members and a second shredder assembly having a plurality of second shredder members, said first and second shredder members being adapted to cooperate with one another to shred wet chip materials,
   said shredder apparatus further comprising a fixed shaft located within said inlet section, a bearing assembly disposed on said shaft, a rotatable rotor disposed on said bearing assembly, and a seal assembly disposed on said shaft for enclosing said bearing assembly between said rotor and said shaft, said first shredder members attached to and rotatable with said rotor and said second shredder members seated on but free from rotation with said rotor; and,
   a drive assembly coupled to said rotor to rotate said rotor relative to said shaft for actuating said shredder members of said one of said shredder assemblies relative to said shredder members of the other of said shredder assemblies whereby said first and second shredder members cooperate to shred wet chip materials within said inlet section.

2. A parts separator apparatus in accordance with claim 1 wherein said shredder apparatus is positioned contiguous to said drop-out opening.

3. A parts separator apparatus in accordance with claim 2 wherein said drive assembly includes a reversible motor and a controller system for sensing an unwanted solid contacting said shredder members of said one of said shredder assemblies and for reversing said motor to change the direction of travel of said solid within said parts separator apparatus.

4. A parts separator apparatus in accordance with claim 1 wherein each of said second shredder members is fixedly disposed within said inlet chute section whereby said second shredder members each remains stationary during a shredding operation.

5. A parts separator apparatus in accordance with claim 4 wherein each of said second shredder members includes a base portion having an opening and each of said second shredder members is disposed on said rotor at the location of said opening.

6. A parts separator apparatus in accordance with claim 4 wherein each of said second shredder members includes at least one comb arm adapted to cooperate with at least one first shredder member to shred wet chip material.

7. A parts separator apparatus in accordance with claim 6 wherein said at least one comb arm is serrated.

8. A parts separator apparatus in accordance with claim 7 wherein:
   said first shredder members each has a plurality of spaced shredder arms; and
   said drive assembly includes a reversible motor for causing said first shredder members to rotate in a first direction and in a second direction.

9. A parts separator apparatus in accordance with claim 4 wherein said second members each have a first comb arm and a second comb arm spaced from said first comb arm.

10. A parts separator apparatus for shredding wet chip materials and separating out unwanted solids from the material, said parts separator apparatus comprising:
    a frame assembly comprising an inlet section having a top wall, a bottom wall and a pair of spaced side walls, an outlet section having a wet chip outlet opening, and a drop-out opening disposed between said inlet and outlet sections; and
    a shredder apparatus disposed within said inlet section, said shredder apparatus including a fixed shaft located within said inlet section, a bearing assembly disposed on said shaft, a rotatable rotor disposed on said bearing assembly, a seal assembly disposed on said shaft for enclosing said bearing assembly between said rotor and said shaft, first shredder members attached to and rotatable with said rotor, second shredder members seated on but free from rotation with said rotor, said second shredder members each including at least one fixed comb arm adapted to cooperate with at least one of said first shredder members; and
    a drive assembly coupled to said rotor to rotate said rotor relative to said shaft.

11. The parts separator apparatus of claim 10 wherein said at least one fixed comb arm is serrated.

12. The parts separator apparatus of claim 11 wherein said second shredder members each include a base having an opening therein for receipt of said rotor therethrough.

13. The parts separator apparatus of claim 12 wherein each second shredder member includes a first comb arm and a second comb arm spaced from said first comb arm.

* * * * *